(12) United States Patent
Mueller

(10) Patent No.: US 7,178,652 B2
(45) Date of Patent: Feb. 20, 2007

(54) POWER TRANSMISSION DEVICE HAVING TORQUE TRANSFER MECHANISM WITH POWER-OPERATED CLUTCH ACTUATOR

(75) Inventor: Joseph G. Mueller, Ballston Spa, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

(21) Appl. No.: 11/270,385

(22) Filed: Nov. 9, 2005

(65) Prior Publication Data

US 2006/0054373 A1    Mar. 16, 2006

Related U.S. Application Data

(63) Continuation of application No. 10/930,031, filed on Aug. 30, 2004, now Pat. No. 6,964,315, which is a continuation of application No. 10/409,252, filed on Apr. 8, 2003, now Pat. No. 6,808,037.

(51) Int. Cl.
*F16H 1/44* (2006.01)
(52) U.S. Cl. ..................... 192/84.6; 475/238
(58) Field of Classification Search ............ 192/84.6, 192/84.7, 93.1, 70.23; 180/247, 248, 249, 180/250, 197; 475/231, 233, 237, 238
See application file for complete search history.

(56) References Cited

U.S. PATENT DOCUMENTS

| | | |
|---|---|---|
| 4,805,486 A | 2/1989 | Hagiwara et al. |
| 4,834,229 A | 5/1989 | Kanazawa |
| 4,895,236 A | 1/1990 | Sakakibara et al. |
| 4,950,214 A | 8/1990 | Botterill |
| 4,976,347 A * | 12/1990 | Sakakibara et al. ........... 192/20 |
| 5,007,886 A | 4/1991 | Holmquist et al. |
| 5,080,640 A | 1/1992 | Botterill |
| 5,323,871 A | 6/1994 | Wilson et al. |
| 5,407,024 A | 4/1995 | Watson et al. |
| 5,423,235 A | 6/1995 | Botterill et al. |
| 6,296,590 B1 | 10/2001 | Gassmann |
| 6,398,686 B1 | 6/2002 | Irwin |
| 6,405,822 B1 | 6/2002 | Lee |
| 6,446,772 B1 | 9/2002 | Inose et al. |
| 6,503,167 B1 | 1/2003 | Sturm |
| 6,561,939 B1 | 5/2003 | Knapke |
| 6,742,642 B1 | 6/2004 | Stevenson et al. |
| 2004/0067812 A1 | 4/2004 | Williams |

FOREIGN PATENT DOCUMENTS

| | | |
|---|---|---|
| DE | 3908478 A1 | 10/1989 |
| JP | 2-18117 | 1/1990 |
| JP | 3-66927 | 3/1999 |

* cited by examiner

*Primary Examiner*—Kevin Hurley
(74) *Attorney, Agent, or Firm*—Harness, Dickey & Pierce, P.L.C.

(57) ABSTRACT

A torque transfer mechanism is provided for controlling the magnitude of a clutch engagement force exerted on a multi-plate clutch assembly that is operably disposed between a first rotary and a second rotary member. The torque transfer mechanism includes a clutch actuator for generating and applying a clutch engagement force on the clutch assembly.

22 Claims, 9 Drawing Sheets

# POWER TRANSMISSION DEVICE HAVING TORQUE TRANSFER MECHANISM WITH POWER-OPERATED CLUTCH ACTUATOR

CROSS-REFERENCE TO RELATED APPLICATIONS

This application is a continuation of U.S. patent application Ser. No. 10/930,031 filed Aug. 30, 2004, now U.S. Pat. No. 6,694,315 which is a continuation of U.S. patent application Ser. No. 10/409,252 filed on Apr. 8, 2003, now U.S. Pat. No. 6,808,037.

FIELD OF THE INVENTION

The present invention relates generally to power transfer systems for controlling the distribution of drive torque between the front and rear drivelines of a four-wheel drive vehicle. More particularly, the present invention is directed to a power transmission device for use in motor vehicle driveline applications and having a power-operated clutch actuator that is operable for controlling actuation of a multi-plate friction clutch assembly.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation. For example, the torque transfer mechanism can include a dog-type lock-up clutch that can be selectively engaged for rigidly coupling the secondary driveline to the primary driveline to establish a "part-time" four-wheel drive mode. In contrast, drive torque is only delivered to the primary driveline when the lock-up clutch is released for establishing a two-wheel drive mode.

A modern trend in four-wheel drive motor vehicles is to equip the power transmission device with an adaptive transfer clutch in place of the lock-up clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch plate assembly. The clutch actuator can be a power-operated device that is actuated in response to electric control signals sent from an electronic controller unit (ECU). Variable control of the electric control signal is typically based on changes in current operating characteristics of the vehicle (i.e., vehicle speed, interaxle speed difference, acceleration, steering angle, etc.) as detected by various sensors. Thus, such "on-demand" power transmission devices can utilize adaptive control schemes for automatically controlling torque distribution during all types of driving and road conditions.

A large number of on-demand power transmission devices have been developed with an electrically-controlled clutch actuator that can regulate the amount of drive torque transferred to the secondary output shaft as a function of the value of the electrical control signal applied thereto. In some applications, the transfer clutch employs an electromagnetic clutch as the power-operated clutch actuator. For example, U.S. Pat. No. 5,407,024 discloses an electromagnetic coil that is incrementally activated to control movement of a ball-ramp drive assembly for applying a clutch engagement force on the multi-plate clutch assembly. Likewise, Japanese Laid-open Patent Application No. 62-18117 discloses a transfer clutch equipped with an electromagnetic actuator for directly controlling actuation of the multi-plate clutch pack assembly.

As an alternative, the transfer clutch can employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm that is operable for applying the clutch engagement force to the multi-plate clutch assembly. Moreover, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch pack.

While many on-demand clutch control systems similar to those described above are currently used in four-wheel drive vehicles, a need exists to advance the technology and address recognized system limitations. For example, the size and weight of the friction clutch components and the electrical power requirements of the clutch actuator needed to provide the large clutch engagement loads may make such system cost prohibitive in some four-wheel drive vehicle applications. In an effort to address these concerns, new technologies are being considered for use in power-operated clutch actuator applications.

SUMMARY OF THE INVENTION

Thus, its is an object of the present invention to provide a power transmission device for use in a motor vehicle having a torque transfer mechanism equipped with a power-operated clutch actuator that is operable to control engagement of a multi-plate clutch assembly.

As a related object, the torque transfer mechanism of the present invention is well-suited for use in motor vehicle driveline applications to control the transfer of drive torque between a first rotary member and a second rotary member.

According to one preferred embodiment, a transfer case is provided for use in a four-wheel drive motor vehicle having a powertrain and first and second drivelines. The transfer case includes a first shaft driven by the powertrain and adapted for connection to the first driveline, a second shaft adapted for connection to the second driveline, and a torque transfer mechanism. The torque transfer mechanism includes a friction clutch assembly operably disposed between the first shaft and the second shaft, and a clutch actuator assembly for generating and applying a clutch engagement force on the friction clutch assembly. The clutch actuator assembly includes an electric motor, a geared reduction unit and a clutch apply operator. The electric motor drives the geared reduction unit which, in turn, controls the direction and amount of rotation of a drive member of the clutch apply operator. The drive member supports rollers which ride against a tapered or ramped surface of a cam member. The contour of the ramped surface causes the cam member to move axially for causing corresponding translation of a thrust member. The thrust member transfers the thrust force generated by the cam member to disk levers which amplify the clutch engagement force exerted on the friction clutch assembly. A control system including vehicle sensors and a controller are provided to control actuation of the electric motor.

According to another embodiment of a power transmission device, an in-line coupling is equipped with the torque transfer mechanism for selectively and/or automatically transferring drive torque from the first driveline to the second driveline.

According to yet another embodiment of a power transmission device, the torque transfer mechanism is operably associated with a power transfer unit for selectively and/or automatically transferring drive torque from the first driveline to the second driveline. In a related application, the torque transfer mechanism is operably installed between rotary components of an interaxle differential to adaptive control torque biasing and limit slip between the first and second drivelines.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred from a first rotary member to a second rotary member. The torque transfer mechanism finds particular application in power transmission devices for use in motor vehicle drivelines such as, for example, an on-demand clutch in a transfer case or in-line torque coupling, a biasing clutch associated with a differential assembly in a transfer case or a drive axle assembly, or as a shift clutch in a multi-speed automatic transmission. Thus, while the present invention is hereinafter described in association with particular arrangements for use in specific driveline applications, it will be understood that the arrangements shown and described are merely intended to illustrate embodiments of the present invention.

Figure 1:
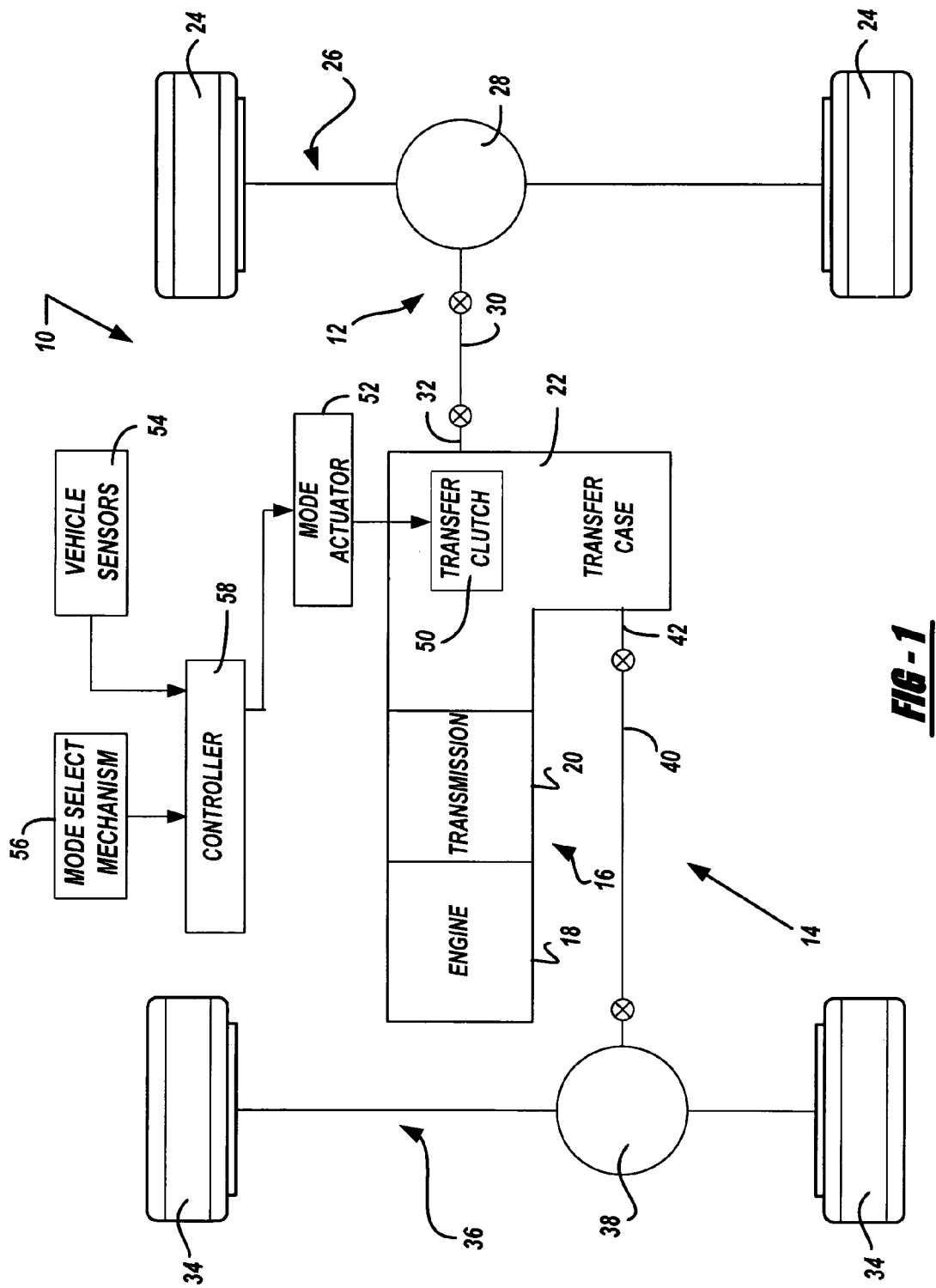
FIG. 1 illustrates the drivetrain of a four-wheel drive vehicle equipped with the power transmission device of the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a power transmission device hereinafter referred to as transfer case 22. Rear driveline 12 includes a pair of rear wheels 24 connected at opposite ends of a rear axle assembly 26 having a rear differential 28 coupled to one end of a rear prop shaft 30, the opposite end of which is coupled to a rear output shaft 32 of transfer case 22. Front driveline 14 includes a pair of front wheels 34 connected at opposite ends of a front axle assembly 36 having a front differential 38 coupled to one end of a front prop shaft 40, the opposite end of which is coupled to a front output shaft 42 of transfer case 22.

With continued reference to the drawings, drivetrain 10 is shown to further include an electronically-controlled power transfer system for permitting a vehicle operator to select between a two-wheel drive mode, a locked ("part-time") four-wheel drive mode, and an adaptive ("on-demand") four-wheel drive mode. In this regard, transfer case 22 is equipped with a transfer clutch 50 that can be selectively actuated for transferring drive torque from rear output shaft 32 to front output shaft 42 for establishing the part-time and on-demand four-wheel drive modes. The power transfer system further includes a power-operated mode actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of mode actuator 52 in response to input signals from vehicle sensors 54 and mode selector 56.

Figure 2:
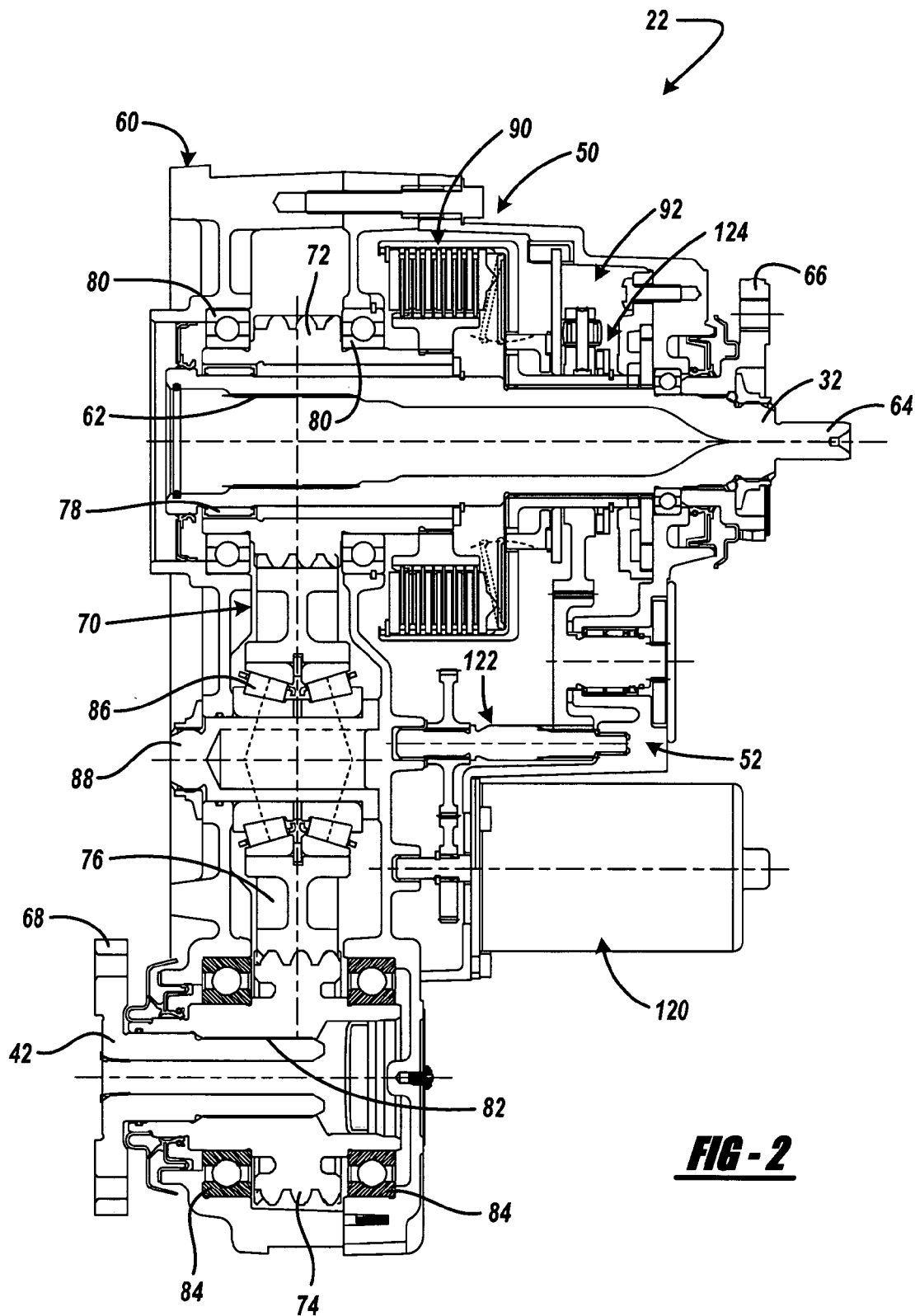
FIG. 2 is a sectional view of a transfer case associated with the drivetrain shown in FIG. 1 and which is equipped with a torque transfer mechanism according to the present invention.
Figure 3:
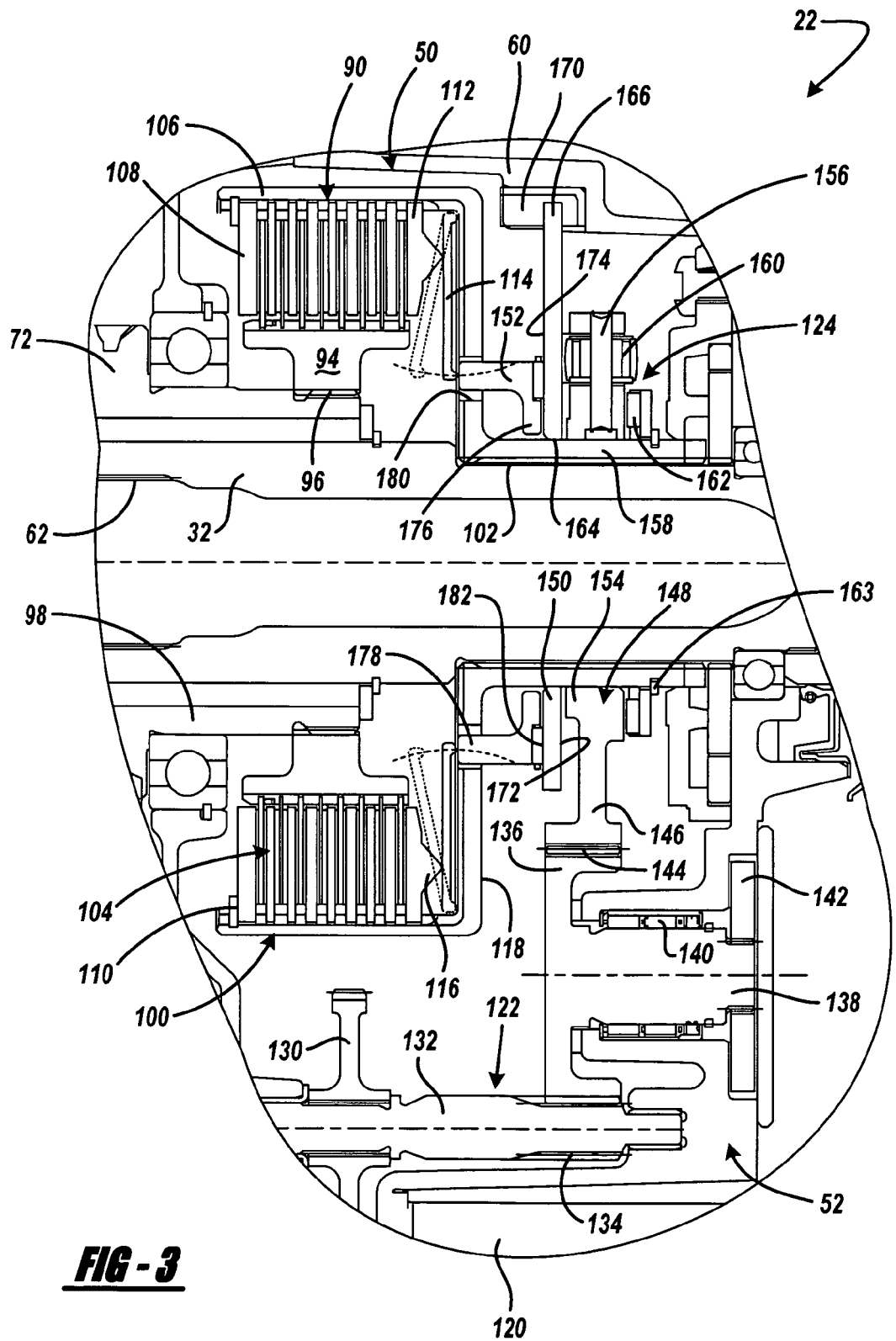
FIG. 3 is an enlarged partial view taken from FIG. 2 showing components of the torque transfer mechanism is greater detail.

Transfer case 22 is shown in FIGS. 2 and 3 to include a multi-piece housing 60 from which rear output shaft 32 is rotatably supported. Rear output shaft 32 includes an internally-splined first end segment 62 adapted for connection to the output shaft of transmission 20 and a second end segment 64 to which a yoke 66 is secured for connection to rear propshaft 30. Front output shaft 42 is likewise rotatably supported in housing 60 and includes an integral yoke segment 68 adapted for connection to front propshaft 40.

Transfer clutch 50 is operably arranged to transfer rotary power (i.e., drive torque) from rear output shaft 32 to front output shaft 42 through a transfer assembly 70. Transfer assembly 70 includes a first gear 72, a second gear 74, and a third gear 76 that is in meshed engagement with first gear 72 and second gear 74. First gear 72 is shown to be rotatably supported on rear output shaft 32 via a bearing assembly 78 and likewise be rotatably supported from housing 60 via a pair of laterally-spaced bearing assemblies 80. Second gear 74 is coupled via a spline connection 82 to front output shaft 42 and is rotatably supported from housing 60 by a pair of laterally-spaced bearing assemblies 84. Finally, third gear 76 is rotatably supported by bearing assemblies 86 on a stub shaft 88 that is non-rotatably secured to housing 60. It is contemplated that geared transfer assembly 70 could be replaced with a well-known chain and sprocket type transfer system if desired.

As will be detailed, transfer clutch 50 includes a multi-plate friction clutch assembly 90 and mode actuator 52 includes a motor-driven clutch actuator assembly 92, which together define the torque transfer mechanism of the present invention. Clutch assembly 90 is shown to include a clutch hub 94 fixed via a spline connection 96 to a tubular segment 98 of first gear 72, a clutch drum 100 fixed via a spline connection 102 to rear output shaft 32, and a multi-plate clutch pack 104 operably disposed between hub 94 and drum 100. Clutch pack 104 includes a set of outer clutch plates that are splined for rotation with and axial movement on an outer cylindrical rim segment 106 of drum 100. Clutch pack 104 also includes a set of inner clutch plates that are splined for rotation with and axial movement on clutch hub 94. Clutch assembly 90 further includes a reaction plate 108 splined for rotation with rim segment 106 of drum 100 and retained thereon via a lock ring 110, and a pressure plate 112 also splined for rotation with rim segment 106 of drum 100. Pressure plate 112 is arranged to exert a compressive clutch engagement force on clutch pack 104 in response to pivotal movement of disk levers 114. Disk levers 114 are shown to be located between an annular rim projection 116 on pressure plate 112 and a radial plate segment 118 of drum 100.

Pressure plate 112 is axially moveable relative to clutch pack 104 between a first or "released" position and a second or "locked" position. With pressure plate 112 in its released position, a minimum clutch engagement force is exerted on clutch pack 104 such that virtually no drive torque is transferred from rear output shaft 32 through clutch assembly 90 and transfer assembly 70 to front output shaft 42 so as to establish the two-wheel drive mode. In contrast, location of pressure plate 112 in its locked position causes a maximum clutch engagement force to be applied to clutch pack 104 such that front output shaft 42 is, in effect, coupled for common rotation with rear output shaft 32 so as to establish the part-time four-wheel drive mode. Therefore, accurate control of the position of pressure plate 112 between its released and locked positions permits adaptive regulation of the amount of drive torque transferred from rear output shaft 32 to front output shaft 42, thereby establishing the on-demand four-wheel drive mode.

To provide means for moving pressure plate 112 between its released and locked positions, clutch actuator assembly 92 is generally shown to include an electric motor 120, a geared reduction unit 122, and a clutch apply operator 124. Electric motor 120 is secured to housing 60 and includes a driveshaft 126. Reduction unit 122 includes three meshed gearsets each providing a ratio reduction to provide a desired cumulative reduction between motor driveshaft 126 and apply operator 124. In particular, a first gearset includes a first gear 128 driven by driveshaft 126 and which is meshed with a second gear 130 driving a transfer shaft 132. Transfer shaft 132 is shown to have its opposite ends rotatably supported in sockets formed in housing 60. The second gearset includes a third gear 134 driven by transfer shaft 132 and which is meshed with a fourth gear 136. Fourth gear 136 is shown to be integrally formed on a second transfer shaft 138 which is rotatably supported via a bearing assembly 140 in an aperture formed in housing 60. A rotary position sensor 142 is mounted for rotation with second transfer shaft 138. The third gearset includes meshed engagement of fourth gear 136 with gear teeth 144 on a geared sector portion 146 of a drive member 148 associated with clutch apply operator 124. While not limited thereby, it is contemplated that reduction unit 122 provide a reduction in the range of 10:1 to 20:1 so as to permit use of a small low power electric motor.

Figure 4:
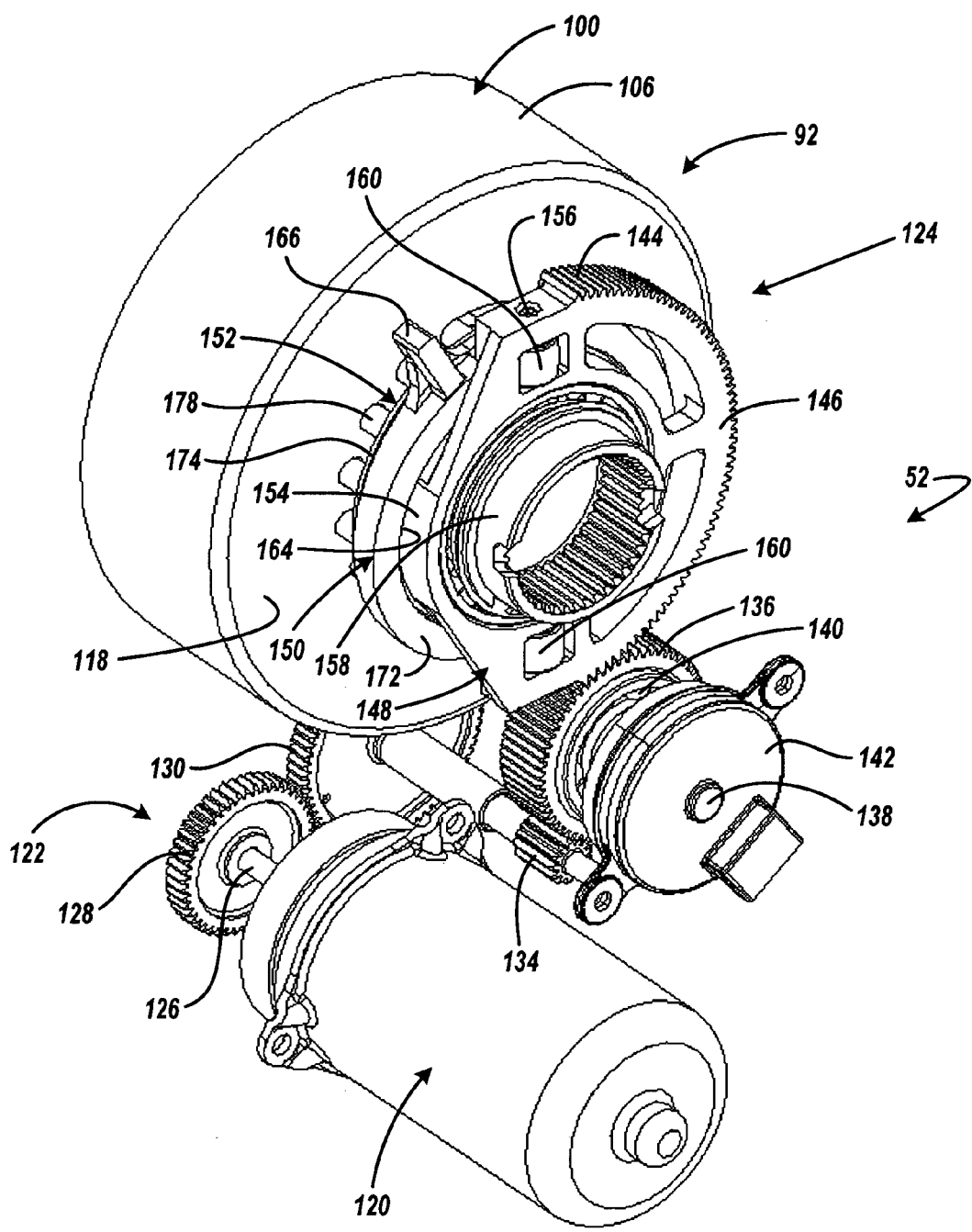
FIG. 4 is a pictorial view of components associated with the torque transfer mechanism of the present invention.

As best seen from FIGS. 3 and 4, clutch apply operator 124 includes drive member 148, a cam member 150, and a thrust member 152. Drive member 148 includes an annular hub segment 154 supported for angular movement on an inner rim segment 158 of clutch drum 100. Sector portion 146 is shown to extend from hub segment 154 and have teeth 144 extending for approximately 180°. Drive member 148 further includes a pair of diametrically opposed rollers 160 that are retained in rolling channels formed in hub segment 154. Rollers 160 are shown to be mounted for rotation about the axis of retainer pins 156 which are secured to hub segment 154. A thrust bearing assembly 162 axial locates and a snap ring 163 retains drive member 148 on inner rim segment 158 of drum 100.

Cam member 150 is a plate-like structure having an aperture 164 surrounding inner rim segment 158 of drum 100 and includes an outwardly extending lug projection 166. Lug 166 is retained in a slot 170 formed in housing 60 such that cam plate 150 is grounded against rotation but may move axially relative to housing 60 and drum 100. Cam plate 150 defines a first face surface 172 and a second face surface 174. First face surface 172 is tapered and rollers 160 on drive member 148 are maintained in rolling contact therewith.

Thrust member 152 includes a radial segment 176 surrounding inner rim segment 158 of drum 100, and a plurality of circumferentially-spaced pins 178 that extend axially from radial segment 176. Each pin 178 has a terminal end which extends through a thoroughbore 180 formed in plate segment 118 of drum 100 and which is adapted to engage the free end of disk levers 114. A bearing assembly 182 is provided between second face surface 174 of cam plate 150 and radial segment 176 of thrust plate 152. The tapered contour of first face surface 172 on cam plate 150 is selected to cause axial translation of cam plate 150 from a retracted position to an extended position in response to drive member 148 being rotated in a first direction through approximately 160° of angular travel. Such rotation of drive member 148 in the first direction is caused by electric motor 120 driving driveshaft 126 in a first rotary direction. Likewise, cam plate 150 is translated from its extended position back to its retracted position in response to drive member 148 being rotated in a second direction through the same 160° of angular travel. Such rotation of drive member 148 in the second direction is caused by electric motor 120 driving driveshaft in a second rotary direction. With cam plate 150 in its retracted position, disk levers 114 act on pins 178 to bias thrust member 152 against second face surface 174 so as to release disk levers 114 from engagement with pressure plate 112, thereby allowing pressure plate 112 to return to its released position. In contrast, movement of cam plate 150 to its extended position causes pins 178 to forcibly pivot disk levers 114 to the position shown in phantom lines which, in turn, causes pressure plate 112 to move to its locked position.

In operation, when mode selector 56 indicates selection of the two-wheel drive mode, controller 58 signals electric motor 120 to rotate driveshaft 126 in the second direction for moving cam plate 150 until it is located in its retracted position. Such action permits disk levers 114 to forcibly urge pressure plate 112 to move to its released position, thereby releasing clutch assembly 90. If mode selector 56 thereafter indicates selection of the part-time four-wheel drive mode, electric motor 120 is signaled by controller 58 to rotate driveshaft 126 in the first direction for causing linear translation of cam plate 150 until it is located in its extended position. Such movement of cam plate 150 to its extended position causes corresponding movement of pressure plate 112 to its locked position, thereby coupling front output shaft 42 to rear output shaft 32 through clutch assembly 90 and transfer assembly 70.

When mode selector 56 indicates selection of the on-demand four-wheel drive mode, controller 58 energizes motor 120 to rotate driveshaft 126 until cam plate 150 is located in a ready or "stand-by" position. This position may be its retracted position or, in the alternative, an intermediate position. In either case, a predetermined minimum amount of drive torque is delivered to front output shaft 42 through clutch assembly 90 in this stand-by condition. Thereafter, controller 58 determines when and how much drive torque needs to be transferred to front output shaft 42 based on current tractive conditions and/or operating characteristics of the motor vehicle, as detected by sensors 54. As will be appreciated, any control schemes known in the art can be used with the present invention for adaptively controlling actuation of transfer clutch 50 in a driveline application.

The arrangement described for mode actuator 52 is an improvement over the prior art in that the torque amplification provided by reduction gearset 122 combined with the force amplification provided by apply operator 124 and disk levers 114 permit use of a small low-power electric motor and yet provides extremely quick response and precise control over the position of cam plate 150 and thus the magnitude of the clutch engagement force applied to clutch pack 104. In this regard, clutch operator 124 is designed to provide a constant mechanical advantage so as to generate a constant torque to force conversion regardless of the rotated position of drive member 148. This feature allows clutch operator 124 to be less sensitive to component manufacturing and assembly-related clearances. In addition, fixation of rollers 160 to drive member 148 provides a positive connection so that roller 160 can be driven to any desired position in either direction without reliance on the need to "back drive" upon release. Furthermore, the approximate 160° of angular rotation of drive plate 148 improves the resolution characteristics of position sensor 142 for more precise control of the system. Finally, all forces generated are contained by drum 100, thereby permitting the clutch assembly to be packaged into several different driveline configurations without affecting the loads transferred through the main bearings.

Figure 5:
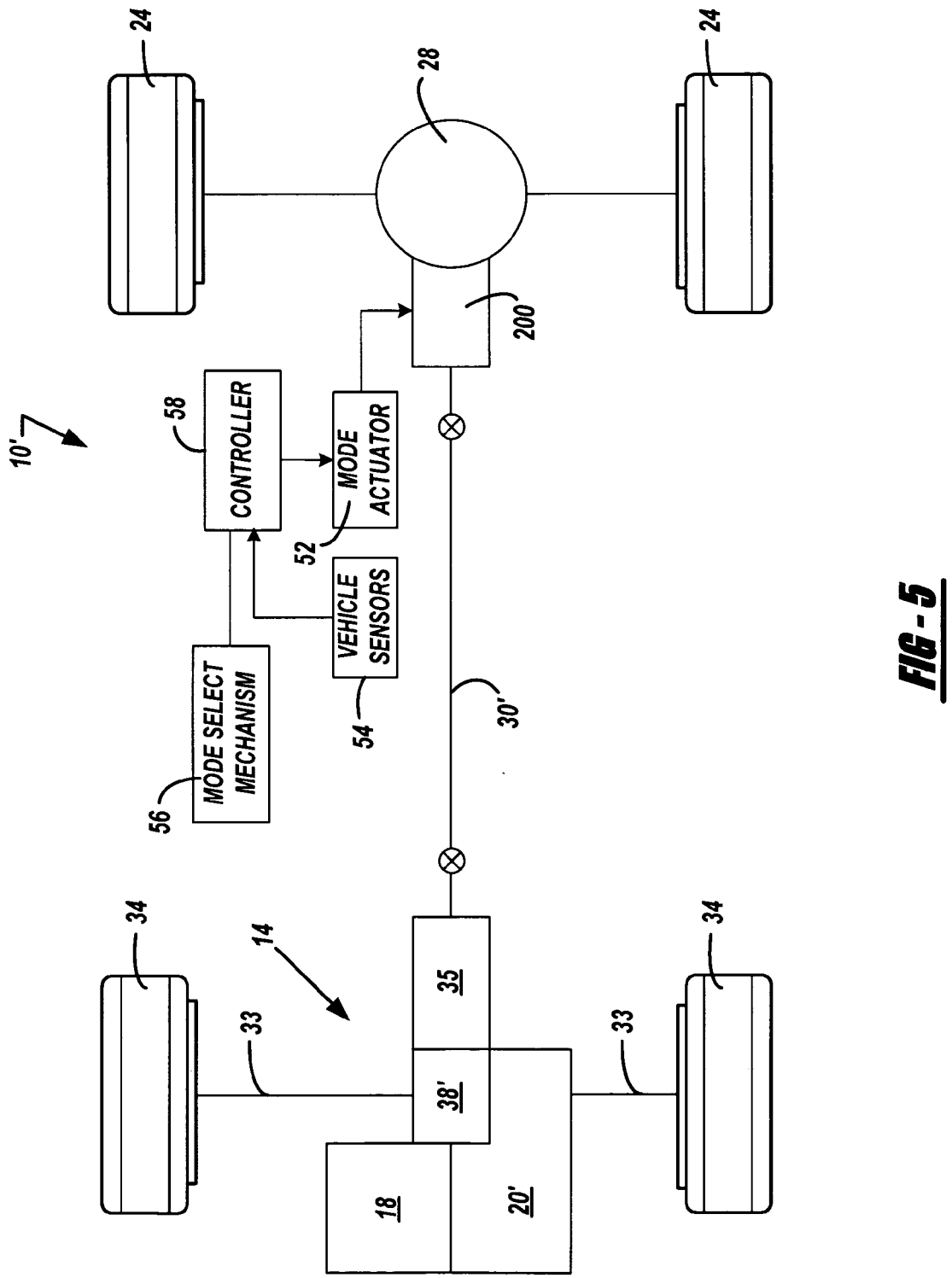
FIG. 5 is a schematic illustration of an alternative driveline for a four-wheel drive motor vehicle equipped with a power transmission device of the present invention.

To illustrate an alternative power transmission device to which the present invention is applicable, FIG. 5 schematically depicts a front-wheel based four-wheel drivetrain layout 10' for a motor vehicle. In particular, engine 18 drives a multi-speed transmission 20' having an integrated front differential unit 38' for driving front wheels 34 via axle shafts 33. A transfer unit 35 is also driven by transmission 20' for delivering drive torque to the input member of an in-line torque transfer coupling 200 via a drive shaft 30'. In particular, the input member of torque coupling 200 is coupled to drive shaft 30' while its output member is coupled to a drive component of rear differential 28 which, in turn, drives rear wheels 24 via axleshafts 25. Accordingly, when sensors indicate the occurrence of a front wheel slip condition, controller 58 adaptively controls actuation of torque coupling 200 such that drive torque is delivered "on-demand" to rear wheels 24. It is contemplated that torque transfer coupling 200 would include a multi-plate clutch assembly and a clutch actuator that are generally similar in structure and function to that of the devices previously described herein. Furthermore, while shown in association with rear differential 28, it is contemplated that torque coupling 200 could also be operably located at the front of the motor vehicle for transferring drive torque from transfer unit 35 to drive shaft 30'.

Figure 6:
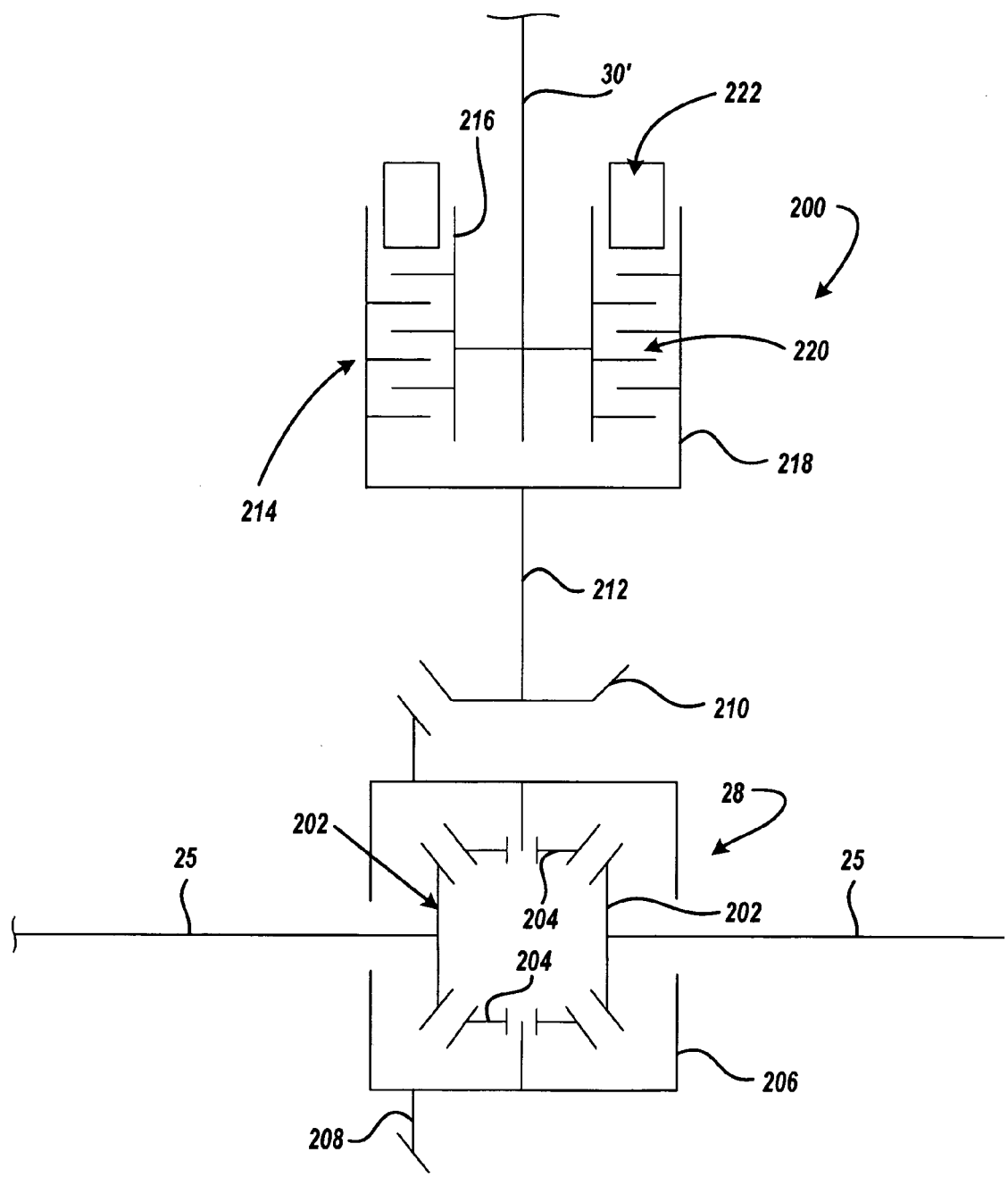
FIG. 6 through 11 are schematic view of additional embodiments of power transmission devices equipped with the torque transfer mechanisms of the present invention.

Referring to FIG. 6, torque coupling 200 is schematically illustrated operably disposed between drive shaft 30' and rear differential 28. Rear differential 28 includes a pair of side gears 202 that are connected to rear wheels 24 via rear axle shafts 25. Differential 28 also includes pinions 204 that are rotatably supported on pinion shafts fixed to a carrier 206 and which mesh with side gears 202. A right-angled drive mechanism is associated with differential 28 and includes a ring gear 208 that is fixed for rotation with carrier 206 and which is meshed with a pinion gear 210 that is fixed for rotation with a pinion shaft 212.

Torque coupling 200 includes a mutli-plate clutch assembly 214 operably disposed between driveshaft 30' and pinion shaft 212. Clutch assembly 214 includes a hub 216 fixed to driveshaft 30', a drum 218 fixed to pinion shaft 212, and a clutch pack 220. Torque coupling 200 also includes a clutch actuator assembly 222 for controlling engagement of clutch assembly 214 and thus the amount of drive torque transferred from drive shaft 30' to differential 28. According to the present invention, clutch actuator assembly 222 is similar in structure and function to clutch actuator assembly 92 and, as such, is only shown in schematic block form. That is, clutch actuator assembly 222 includes an electric motor driving a reduction gearset for controlling rotation of a geared drive member associated with a roller ramp type of clutch apply operator.

Torque coupling 200 permits operation in any of the drive modes previously disclosed. For example, if the on-demand four-wheel drive mode is selected, controller 58 regulates activation of clutch actuator 222 in response to operating conditions detected by sensors 54 by varying the electric control signal sent to the electric motor. Selection of the part-time four-wheel drive mode results in complete engagement of clutch pack 220 such that pinion shaft 212 is rigidly coupled to driveshaft 30'. Finally, in the two-wheel drive mode, clutch pack 220 is released such that pinion shaft 212 is free to rotate relative to driveshaft 30'.

Figure 7:
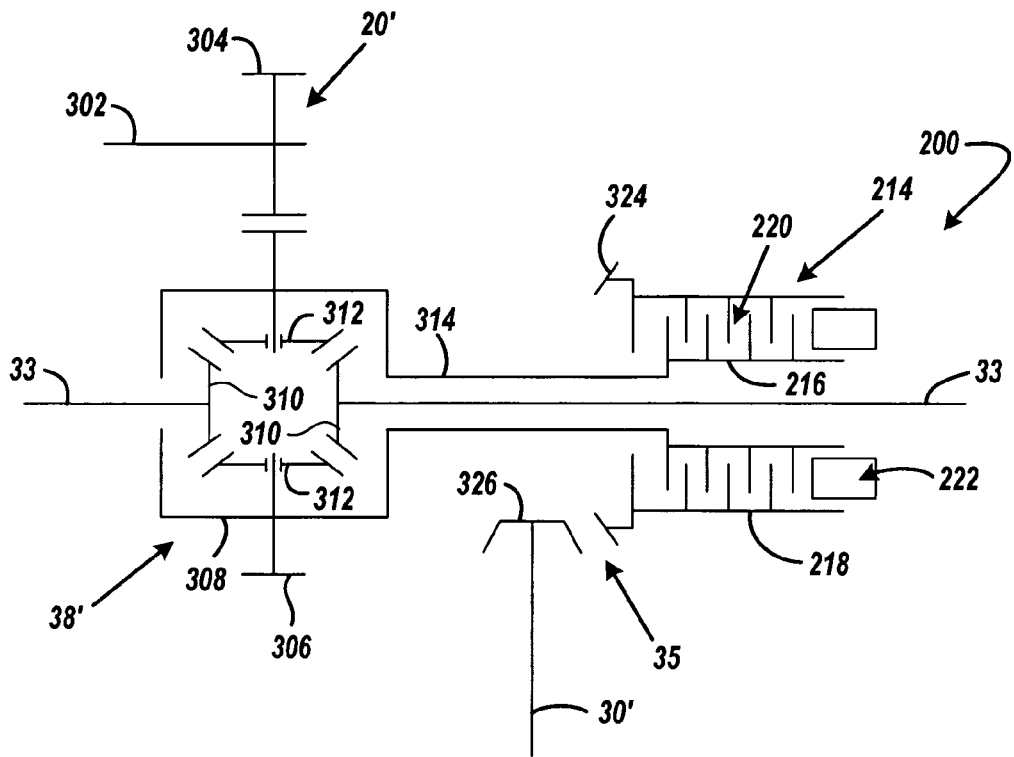

Referring now to FIG. 7, torque coupling 200 is now schematically illustrated in association with an on-demand four-wheel drive system based on a front-wheel drive vehicle similar to that shown in FIG. 5. In particular, an output shaft 302 of transaxle 20' is shown to drive an output gear 304 which, in turn, drives an input gear 306 fixed to a carrier 308 associated with front differential unit 38'. To provide drive torque to front wheels 34, front differential unit 38' includes a pair of side gears 310 that are connected to front wheels 34 via axleshafts 33. Differential unit 38' also includes pinions 312 that are rotatably supported on pinion shafts fixed to carrier 308 and which are meshed with side gears 310. A transfer shaft 314 is provided to transfer drive torque from carrier 308 to clutch hub 216 associated with multi-pate clutch assembly 214.

Transfer unit 35 is a right-angled drive mechanism including a ring gear 324 fixed for rotation with drum 218 of clutch assembly 214 which is meshed with a pinion gear 326 fixed for rotation with drive shaft 30'. As seen, clutch actuator assembly 222 is schematically illustrated for controlling actuation of clutch assembly 212. As before, clutch actuator assembly 222 is similar to motor-driven clutch actuator assembly 92 previously described in that an electric motor is supplied with electric current for controlling translational movement of a cam plate operator which, in turn, controls engagement of clutch pack 220. In operation, drive torque is transferred from the primary (i.e., front) driveline to the secondary (i.e., rear) driveline in accordance with the particular mode selected by the vehicle operator via mode selector 56. For example, if the on-demand four-wheel drive mode is selected, controller 58 modulates actuation of clutch actuator assembly 222 in response to the vehicle operating conditions detected by sensors 54 by varying the value of the electric control signal sent to the motor. In this manner, the level of clutch engagement and the amount of drive torque that is transferred through clutch pack 220 to the rear driveline through transfer unit 35 and drive shaft 30' is adaptively controlled. Selection of a locked or part-time four-wheel drive mode results in full engagement of clutch assembly 214 for rigidly coupling the front driveline to the rear driveline. In some applications, the mode selector 56 may be eliminated such that only the on-demand four-wheel drive mode is available so as to continuously provide adaptive traction control without input from the vehicle operator.

Figure 8:
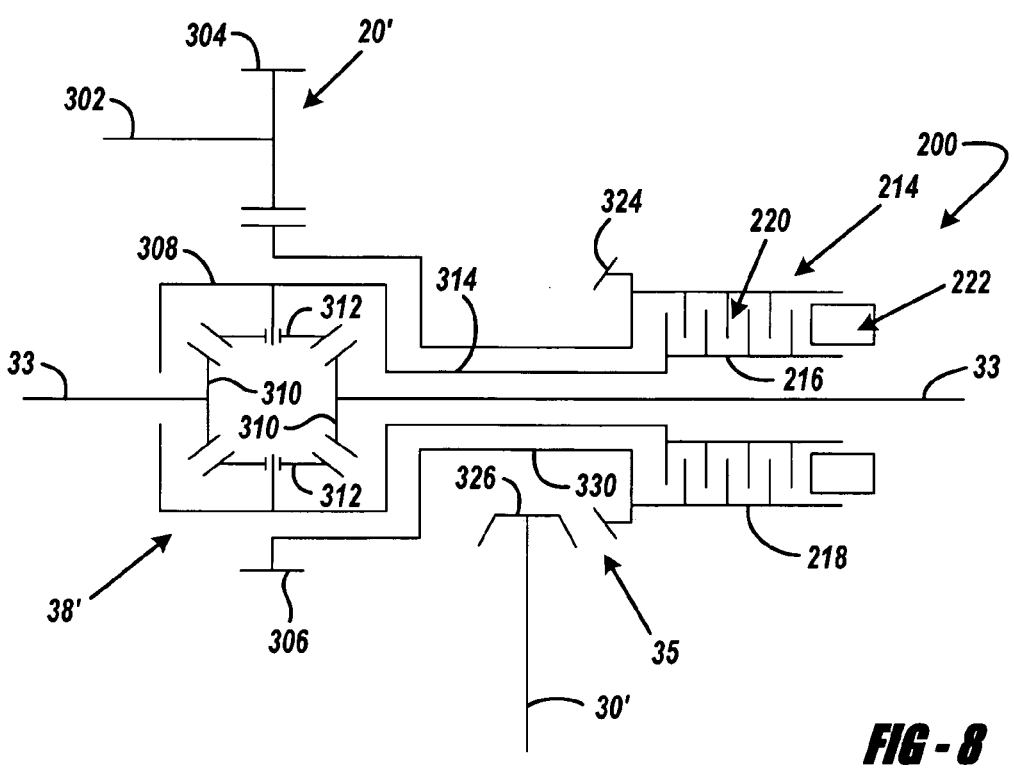

FIG. 8 illustrates a modified version of FIG. 7 wherein an on-demand four-wheel drive system is shown based on a rear-wheel drive motor vehicle that is arranged to normally deliver drive torque to rear wheels 24 while selectively transmitting drive torque to front wheels 34 through torque coupling 200. In this arrangement, drive torque is transmitted directly from transmission output shaft 302 to transfer unit 35 via a drive shaft 330 interconnecting input gear 306 to ring gear 324. To provide drive torque to front wheels 34, torque coupling 200 is shown operably disposed between drive shaft 330 and transfer shaft 314. In particular, clutch assembly 214 is arranged such that drum 218 is driven with ring gear 324 by drive shaft 330. As such, actuation of clutch actuator 222 functions to transfer torque from drum 218 through clutch pack 220 to hub 216 which, in turn, drives carrier 308 of front differential unit 38' via transfer shaft 314. Again, the vehicle could be equipped with mode selector 56 to permit selection by the vehicle operator of either the adaptively controlled on-demand four-wheel drive mode or the locked part-time four-wheel drive mode. In vehicles without mode selector 56, the on-demand four-wheel drive mode is the only drive mode available and provides continuous adaptive traction control without input from the vehicle operator.

Figure 9:
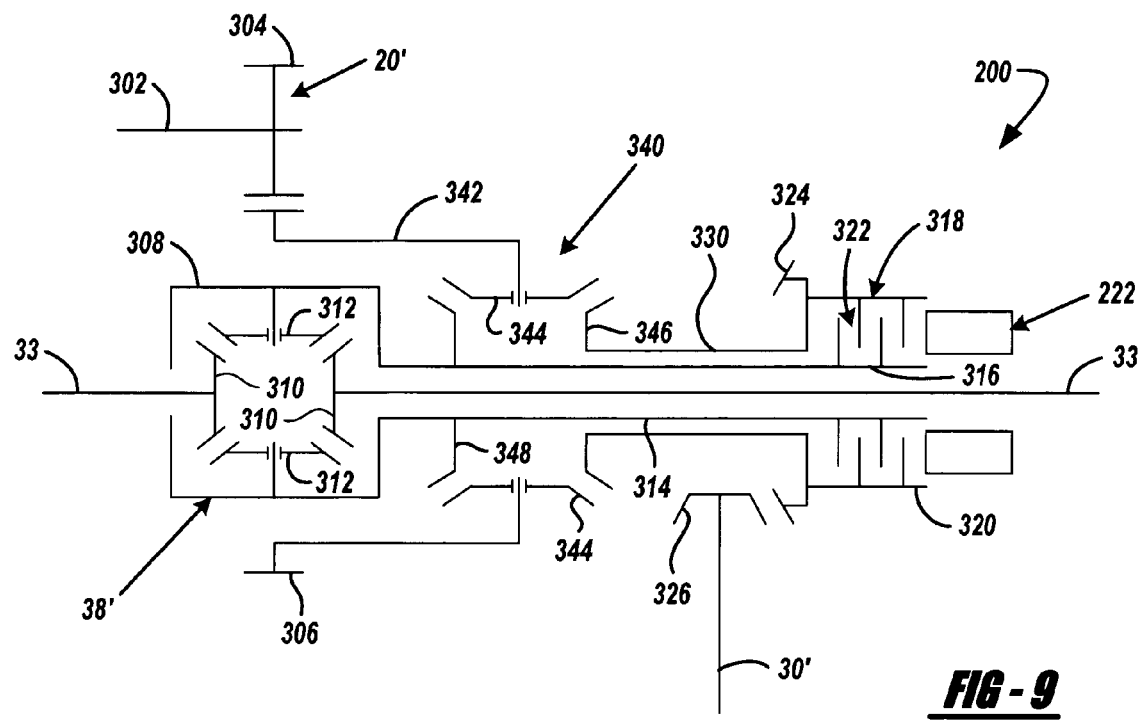

In addition to the on-demand 4WD systems shown previously, the power transmission technology of the present invention can likewise be used in full-time 4WD systems to adaptively bias the torque distribution transmitted by a center or "interaxle" differential unit to the front and rear drivelines. For example, FIG. 9 schematically illustrates a full-time four-wheel drive system which is generally similar to the on-demand four-wheel drive system shown in FIG. 8 with the exception that an interaxle differential unit 340 is now operably installed between carrier 308 of front differential unit 38' and transfer shaft 314. In particular, output gear 306 is fixed for rotation with a carrier 342 of interaxle differential 340 from which pinion gears 344 are rotatably supported. A first side gear 346 is meshed with pinion gears 344 and is fixed for rotation with drive shaft 330 so as to be drivingly interconnected to the rear driveline through transfer unit 35. Likewise, a second side gear 348 is meshed with pinion gears 344 and is fixed for rotation with carrier 308 of front differential unit 38' so as to be drivingly interconnected to the front driveline. Torque transfer mechanism 200 is now shown to be operably disposed between side gears 346 and 348. As such, torque transfer mechanism 200 is operably arranged between the driven outputs of interaxle differential 340 for providing a torque biasing and slip limiting function. Torque transfer mechanism 200 is shown to again include multi-plate clutch assembly 214 and clutch actuator assembly 222. Clutch assembly 214 is operably arranged between transfer shaft 314 and driveshaft 330. In operation, when sensor 54 detects a vehicle operating condition, such as excessive interaxle slip, controller 58 adaptively controls activation of the electric motor associated with clutch actuator assembly 222 for controlling engagement of clutch assembly 318 and thus the torque biasing between the front and rear driveline.

Figure 10:
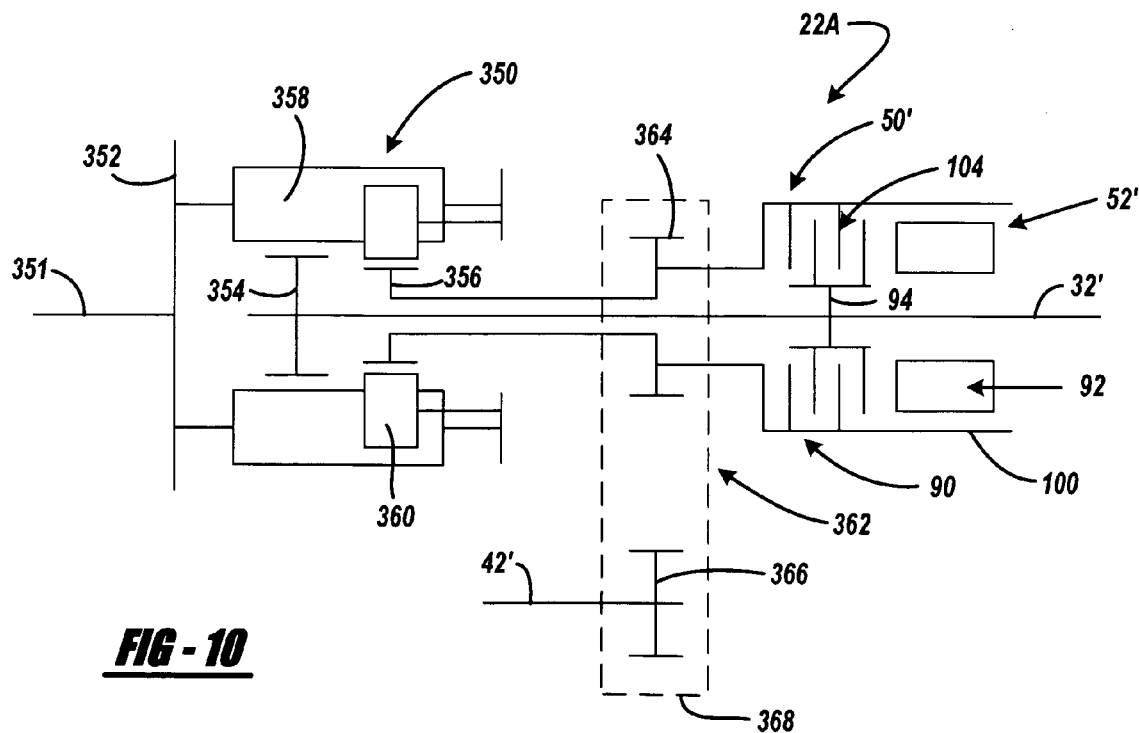

Referring now to FIG. 10, a full-time 4WD system is shown to include a transfer case 22A equipped with an interaxle differential 350 between an input shaft 351 and output shafts 32' and 42'. Differential 350 includes an input defined as a planet carrier 352, a first output defined as a first sun gear 354, a second output defined as a second sun gear 356, and a gearset for permitting speed differentiation between first and second sun gears 354 and 356. The gearset includes meshed pairs of first planet gears 358 and second planet gears 360 which are rotatably supported by carrier 352. First planet gears 358 are shown to mesh with first sun gear 354 while second planet gears 360 are meshed with second sun gear 356. First sun gear 354 is fixed for rotation with rear output shaft 32' so as to transmit drive torque to rear driveline 12. To transmit drive torque to front driveline 14, second sun gear 356 is coupled to transfer assembly 362 which includes a first sprocket 364 rotatably supported on rear output shaft 32', a second sprocket 366 fixed to front output shaft 42', and a power chain 368. Transfer case 22A further includes a biasing clutch 50' having a multi-plate clutch assembly 90 and a mode actuator 52' having a clutch actuator assembly 92. Again, clutch actuator assembly 92 is schematically shown but intended to be substantially similar to that disclosed in association with transfer case 22 of FIGS. 2 and 3.

Figure 11:
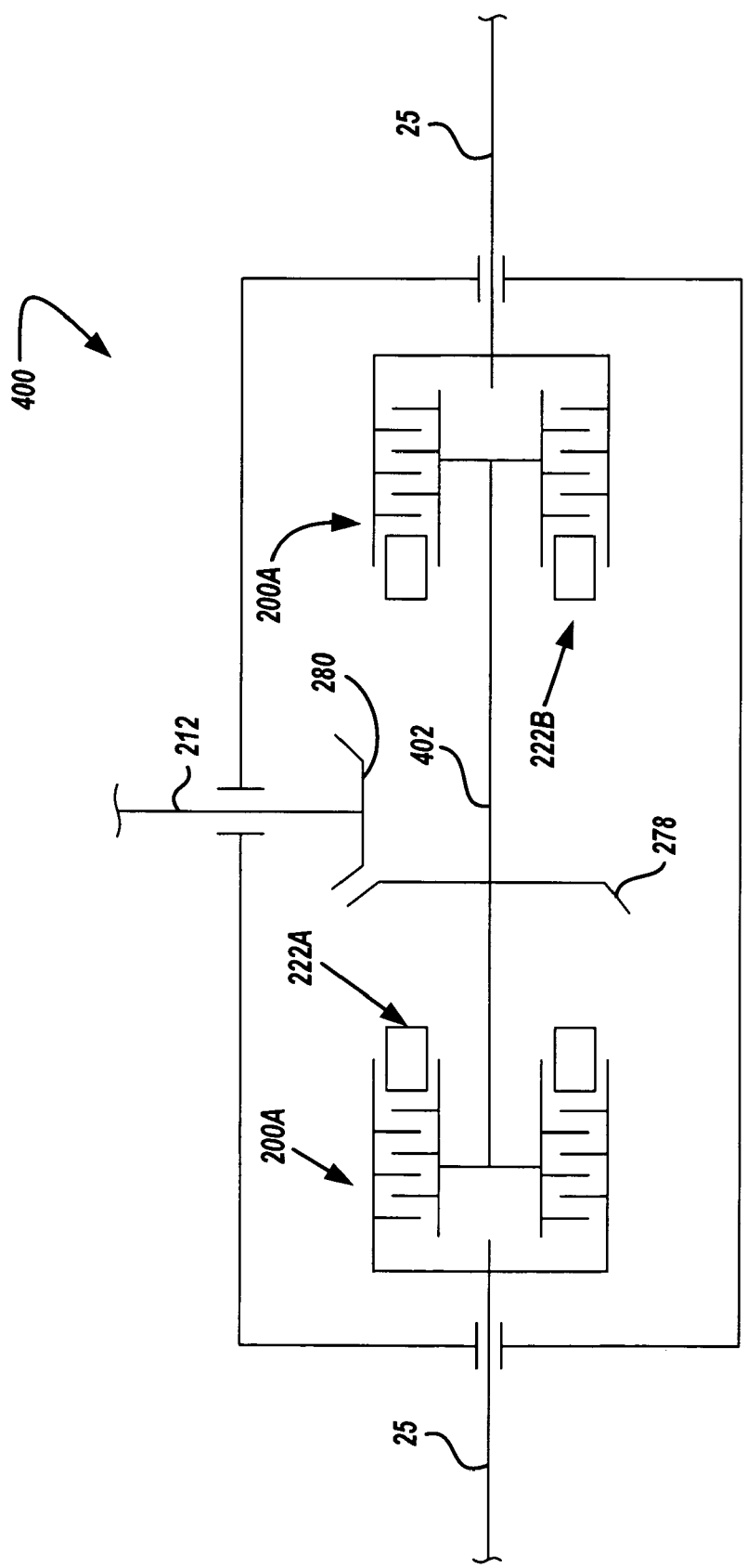

Referring now to FIG. 11, a drive axle assembly 400 is schematically shown to include a pair of torque couplings operably installed between driven pinion shaft 212 and rear axle shafts 25. Pinion shaft 212 drives a right-angle gearset including pinion 210 and ring gear 208 which, in turn, drives a transfer shaft 402. A first torque coupling 200A is shown disposed between transfer shaft 402 and one of axle shaft 25 while a second torque coupling 200B is disposed between transfer shaft 402 and the other of axle shafts 25. Each of the torque couplings can be independently controlled via activation of its corresponding clutch actuator assembly 222A, 222B to adaptively control side-to-side torque delivery. In a preferred application, axle assembly 400 can be used in association with the secondary driveline in four-wheel drive motor vehicles.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
   a first rotary member;
   a second rotary member;
   a transfer clutch operably disposed between said first and second rotary members;
   a clutch actuator controlling engagement of said transfer clutch, said clutch actuator including an electric motor driving a first gear meshed with a second gear, a third gear driven by said second gear and meshed with a fourth gear, a rotary drive member with gear teeth meshed with said fourth gear and having followers engaging a cam surface on a non-rotary cam member; and a control system actuating said electric motor to control the direction and amount of rotary movement of said drive member which controls the directions and amount of translational movement of said cam member relative to said transfer clutch, said control system including a rotary position sensor operable to detect the rotated position of one of said first, second, third and fourth gears.

2. The power transmission device of claim 1 wherein translational movement of said cam member causes concurrent movement of a thrust member relative to said transfer clutch so as to vary the magnitude of a clutch engagement force exerted by said thrust member on said transfer clutch.

3. The power transmission device of claim 2 wherein said cam member has a first face surface defining said cam surface and a second face surface, and wherein said thrust member has a first segment engaging said second face surface of said cam member and a second segment for exerting said clutch engagement force on said transfer clutch.

4. The power transmission device of claim 1 wherein said drive member is rotatable between a first position and a second position in response to activation of said electric motor for causing corresponding sliding movement of said cam member between a retracted position and an extended position relative to said transfer clutch, wherein a minimum clutch engagement force is exerted on said transfer clutch when said cam member is located in its retracted position and a maximum clutch engagement force is exerted on said transfer clutch when said cam member is located in its extended position.

5. The power transmission device of claim 1 wherein said first rotary member is a first shaft which provides drive torque to a first driveline of a motor vehicle, wherein said second rotary member includes a second shaft that is coupled to a second driveline of the motor vehicle, and wherein said transfer clutch is operable to transfer drive torque from said first shaft to said second shaft.

6. The power transmission device of claim 5 defining a transfer case wherein said first shaft is a first output shaft driving the first driveline and said second shaft is a second output shaft coupled to the second driveline, wherein location of said cam member in a first position releases engagement of said transfer clutch and location of said cam member in a second position fully engages said transfer clutch, and wherein said control system is operable to control activation of said electric motor for varying the rotated position of said drive member so as to move said cam member between its first and second positions to controllably vary the drive torque transferred from said first output shaft to said second output shaft.

7. The power transmission device of claim 5 defining a power take-off unit wherein said first shaft provides drive torque to a first differential associated with the first driveline and said second shaft is coupled to a second differential associated with the second driveline.

8. The power transmission device of claim 1 wherein said first rotary member is a drive shaft driven by a drivetrain of a motor vehicle and said second rotary member is a pinion shaft driving a differential associated with an axle assembly of the motor vehicle, and wherein said transfer clutch is disposed between said drive shaft and said pinion shaft such that actuation of said clutch actuator is operable to transfer drive torque from said drive shaft to said pinion shaft.

9. The power transmission device of claim 1 wherein said first rotary member includes a first differential supplying drive torque to a pair of first wheels in a motor vehicle and said second rotary member includes a drive shaft coupled to a second differential interconnecting a pair of second wheels in the motor vehicle, and wherein said transfer clutch is disposed between said first differential and said drive shaft.

10. The power transmission device of claim 1 wherein said first rotary member includes a first shaft supplying drive torque to a second shaft which is coupled to a first differential for driving a pair of first wheels in a motor vehicle, wherein said second output member is a third shaft driving a second differential interconnecting a pair of second wheels of the motor vehicle, and wherein said transfer clutch is operably disposed between said first shaft and said third shaft.

11. The power transmission device of claim 1 further including a differential driven by said first rotary member and having a first output driving a first driveline in a motor vehicle and a second output driving a second driveline in the motor vehicle, and wherein said transfer clutch is operably disposed between said first and second outputs of said differential.

12. A torque transfer mechanism for transferring drive torque from a first rotary member to a second rotary member, comprising:

a friction clutch operably disposed between the first and second rotary members;

a pressure plate moveable between a first position whereat a minimum clutch engagement force is exerted on said friction clutch and a second position whereat a maximum clutch engagement force is exerted on said friction clutch;

a clutch actuator moving said pressure plate between its first and second positions, said clutch actuator including an electric motor, a rotary drive member having rollers and a gear segment driven by said electric motor, and a non-rotary cam member having a cam surface engaging said rollers and which is operable for causing said pressure plate to move between its first and second positions; and a control system actuating said electric motor so as to control rotary movement of said drive member between a first rotary position and a second rotary position, said cam member being located in a first position when said drive member is in its first position so as to cause said pressure plate to be located in its first position, and said cam member is located in a second position when said drive member is rotated to its second position so as to cause said pressure plate to move to its second position.

13. The torque transfer mechanism of claim 12 wherein the first rotary member provides drive torque to a first driveline of a motor vehicle and the second rotary member is coupled to a second driveline of the motor vehicle, and wherein said friction clutch is operable to transfer drive torque from said first driveline to said second driveline.

14. The torque transfer mechanism of claim 13 in a transfer case wherein the first rotary member is a first output shaft driving said first driveline and the second rotary member is a second output shaft coupled to said second driveline, wherein location of said cam member in its first position releases engagement of said friction clutch and location of said cam member in its second position fully engages said friction clutch, and wherein said control system is operable to control activation of said electric motor for varying the position of said cam member between its first and second positions to controllably vary the drive torque transferred from said first output shaft to said second output shaft.

15. The torque transfer mechanism of claim 13 for use in a power take-off unit wherein the first rotary member provides drive torque to a first differential associated with said first driveline, and wherein the second rotary member is coupled to a second differential associated with said secondary driveline.

16. The torque transfer mechanism of claim 12 wherein the first rotary member is a drive shaft driven by a drivetrain of a motor vehicle and the second rotary member is a pinion shaft driving a differential associated with an axle assembly of the motor vehicle, and wherein said friction clutch is disposed between said drive shaft and said pinion shaft such that actuation of said clutch actuator is operable to transfer drive torque from said drive shaft to said pinion shaft.

17. The torque transfer mechanism of claim 12 wherein the first rotary member includes a first differential supplying drive torque to a pair of first wheels in a motor vehicle and the second rotary member includes a drive shaft coupled to a second differential interconnecting a pair of second wheels in the motor vehicle, and wherein said friction clutch is disposed between said first differential and said drive shaft.

18. The torque transfer mechanism of claim 12 wherein the clutch actuator further includes a reduction gear set driven by said electric motor for driving said gear segment of said drive member.

19. A power transfer unit for use in a four-wheel drive vehicle having a powertrain and first and second drivelines, comprising:
a first rotary member driven by the powertrain and to the first driveline;
a second rotary member connected to the second driveline;
a friction clutch operably disposed between said first and second rotary members; and
a clutch actuator generating a clutch engagement force to be applied to said friction clutch, said clutch actuator including a rotary drive member having rollers and a gear segment, a non-rotary cam member having a cam surface in engagement with said rollers, a thrust member disposed between said cam member and said friction clutch, a gear reduction unit meshed with said gear segment of said drive member, and an electric motor driving said gear reduction unit.

20. The power transfer unit of claim 19 further comprising a control system operable to actuate said electric motor so as to control the direction and amount of rotary movement of said drive member for controlling the direction and amount of translational movement of said cam member, such translational movement of said cam member causes movement of said thrust member relative to said friction clutch so as to vary the magnitude of a clutch engagement force exerted on said friction clutch.

21. The transfer case of claim 20 wherein said drive member is rotatable between a first position and a second position in response to activation of said electric motor for causing corresponding translational movement of said cam member between a retracted position and an extended position relative to said friction clutch, said thrust member exerting a minimum clutch engagement force on said friction clutch when said cam member is located in its retracted position and exerting a maximum clutch engagement force on said friction clutch when said cam member is located in its extended position.

22. The transfer case claim 21 wherein location of said cam member in its retracted position acts to release engagement of said friction clutch and location of said cam member in its extended position acts to fully engages said friction clutch, and wherein said control system is operable to cause said electric motor to vary the rotated position of said drive member for moving said cam member between its retracted and extended positions for varying the drive torque transferred from said first rotary member to said second rotary member.

* * * * *